United States Patent
Vaisanen

[11] Patent Number: 5,450,620
[45] Date of Patent: Sep. 12, 1995

[54] CIRCUIT FOR CONTROLLING THE TRANSMIT POWER LEVEL IN A BOOSTER AMPLIFIER FOR A DIGITAL MOBILE PHONE SYSTEM

[75] Inventor: Risto Vaisanen, Salo, Finland

[73] Assignee: Nokia Mobile Phones Ltd., Salo, Finland

[21] Appl. No.: 71,318

[22] Filed: Jun. 2, 1993

[30] Foreign Application Priority Data

Jun. 5, 1992 [FI] Finland .................................. 922605

[51] Int. Cl.⁶ ............................................. H04B 1/40
[52] U.S. Cl. ........................................ 455/127; 455/90
[58] Field of Search ................ 455/126, 127, 129, 89, 455/115, 113, 90, 343, 128; 330/127, 136, 138, 279

[56] References Cited

U.S. PATENT DOCUMENTS

| | | | |
|---|---|---|---|
| 5,077,540 | 12/1991 | Keith et al. | 330/251 |
| 5,086,508 | 2/1992 | Furuno | 455/127 |
| 5,101,175 | 3/1992 | Vaisanen | 455/126 |
| 5,146,614 | 9/1992 | Furuno | 455/89 |

FOREIGN PATENT DOCUMENTS

| | | | |
|---|---|---|---|
| 0310318A2 | 4/1989 | European Pat. Off. | H04Q 7/04 |
| 0392132A2 | 10/1990 | European Pat. Off. | H04B 7/005 |
| 413355A2 | 2/1991 | European Pat. Off. | H04B 1/40 |

*Primary Examiner*—Edward F. Urban
*Assistant Examiner*—Thanh Le
*Attorney, Agent, or Firm*—Perman & Green

[57] ABSTRACT

A booster (2) of a digital portable radio telephone (1) is connected to a connector (11) by arranging a switch (9) in the control signal (TXC-DA) path, said switch changing, under the control of a logic control signal (BST), the power control circuit signal (TXC) of the portable radio telephone into a fixed signal ($V_{bst}$). As a result, a transmit signal of constant power is led to the booster amplifier to be amplified to the level of the control signal (TXC-DA). Similar power control circuits (4,14) are arranged in the portable radio telephone and in the booster amplifier, whereby the properties of the transmit pulse are preserved in booster use.

4 Claims, 1 Drawing Sheet

CIRCUIT FOR CONTROLLING THE TRANSMIT POWER LEVEL IN A BOOSTER AMPLIFIER FOR A DIGITAL MOBILE PHONE SYSTEM

FIELD OF THE INVENTION

The present invention relates to a method of and a circuit for implementing a booster amplifier for a portable radio telephone in a digital mobile phone system.

BACKGROUND OF THE INVENTION

It is known that the radiation power of an antenna can be increased in a mobile phone system, that is usually a portable radio telephone, by inserting a radio frequency power amplifier, a so called booster, between the phone and the antenna. In practise, amplification in the receiving direction must be arranged as well. To avoid extra expenses the structure of the booster is usually kept very simple, for example containing only the necessary power amplifier stages.

In principle a booster amplifier could be connected also to a digital portable radio telephone in the same manner as with analog phones, but the practical solution would be very difficult and expensive. In digital operation the strict timing requirements on the transmit and receive function cause problems, since the signals are sent in short successive bursts which should also be identified in reception. The transmit pulse timing must also be independent of the power level of the transmitter. The power gain control aims at decreasing the noise level in the network, e.g. in the cellular net, and decreasing the power consumption of the phone. For example in the GSM system (Global System for Mobile Communication) the power level setting is based on measurements made at the base stations, there being 16 power levels in the range from +43 dBm to +13 dBm.

In a digital portable radio telephone the timing as well as the wave shape of the leading and the trailing edges of the transmit pulse should remain unmodified also when a booster is used. This leads to the fact that, according to the prior art, the booster power amplifier should be a perfectly linear, preferably class A amplifier. That implies that the booster is required to provide a high output power and high frequency at low operating voltage, e.g. 12 V when used in a car. Furthermore the linearization requires a high bias current and as a result the efficiency of the booster is quite minimal. In addition the booster would be expensive and difficult to implement.

SUMMARY OF THE INVENTION

According to a first aspect of the present invention there is provided a circuit for implementing a booster amplifier for a portable radio telephone in a digital mobile phone system, where the transmit power level of the booster amplifier is controlled from the portable radio telephone by two control signals (TXC-DA, BST), characterized in that in the path of the first control signal (TXC-DA) comprises a switch means which, under the control of a logic control signal (BST), changes a power control circuit signal (TXC) to a predetermined signal ($V_{bst}$), and an output of substantially constant power is fed from the portable radio telephone to the booster to be amplified to the level of the first control signal (TXC-DA).

According to a second aspect of the present invention there is provided a method of implementing a booster amplifier for a portable radio telephone in a digital mobile phone system, wherein the transmit power level of the booster amplifier is controlled by two control signals (TXC-DA, BST), characterized in that switching means are utilized, under the control of a logic control signal (BST), to change the power control circuit signal (TXC) of the portable radio telephone to a predetermined signal ($V_{bst}$), whereby a substantially constant power output is coupled to the booster to be amplified to the level of the first control signal (TXC-DA).

The portable radio telephone and the booster amplifier have similar circuitry for power control and the same control signalling, whereby also the timing and wave shape of the leading and trailing edges of the transmit pulse remain unchanged. Furthermore the similar AB class power amplifier as used in the prior art car phone can be utilized as the power amplifier of the booster.

BRIEF DESCRIPTION OF THE DRAWING

An embodiment of the present invention is described, by way of example, with reference to the single FIGURE which is a simplified block diagram of a circuit in accordance with the present invention.

DETAILED DESCRIPTION OF THE INVENTION

Figure 1:
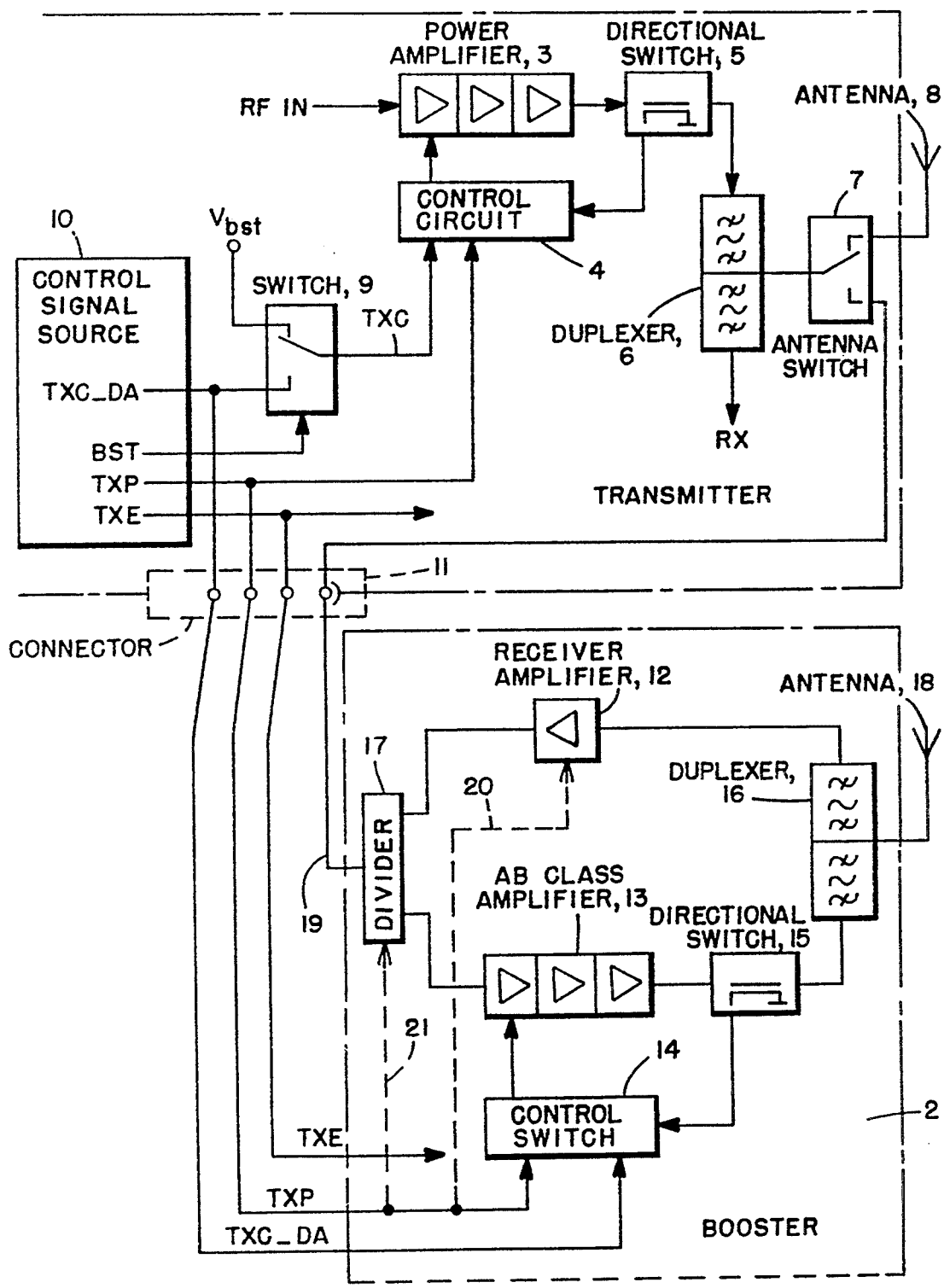

A digital portable radio telephone 1 can be used as an independent unit, and its structure is mainly known. It is explained here only to aid the understanding of the invention. The transmit branch consists of a power amplifier 3 the amplified output of which is directed through a direction switch 5 to a duplexer 6. The duplexer 6 has connections to an input Rx and to an antenna switch 7. An antenna 8 is joined to one external connector of the antenna switch and to the other is joined an auxiliary connector 11 through which the portable radio telephone can be connected to the booster 2. The direction switch 5 provides a feedback signal to a power control circuit 4 that sets the bias voltages for the amplifier 3 via a control line, according to input signals TXP and TXC. Control signal TXE connects the operating voltages to the transmitter stages, with a known method that is not explained here, when the call begins.

In a digital system, e.g. in Time Division Multiple Access (TDMA) environment, the signals are packed in bursts, as was mentioned before. The length of a burst may be about 6.6 ms (U.S.A., Japan) or about 0.5 ms (Europe). (TDMA timeslots are transmit, receive, internal functions, it is a repetitive frame of a length, e.g. 3.6,6 ms, in all about 20 ms).

In a digital portable radio telephone 1 the same power control method based on two control signals TXC-DA and BST from a source 10 of control signals that also provides a control pulse TXP (transistor power enable) and the system voltage source TXE (transistor enable) can be used as illustrated in the patent application FI-896266 source 10 of the aforesaid control signals may be the microprocessor which is located within a mobile radio telephone transceiver. In that case the control voltage of the power amplifier is summed with a rectangular pulse that starts and ends at essentially the same moment of time as the pulse TXC that controls the control amplifier. In a very advantageous embodiment the rectangular pulse is switched off as the control circuit 4 of the power amplifier starts to function. In the application referred to above the main idea of the invention is that the control voltage of the power amplifier is raised by the rectangular pulse very rapidly, immediately as the control pulse TXC starts, near to the threshold level, where the power amplifier starts to function. Hereby the control circuit 4 is able to function immediately as the power amplifier 3 starts to operate. No essential delay, nor raise of the output power then occurs in the beginning and the pulse is of step shape. In this way a good $\cos^2$ shape of the transmit pulse of the power amplifier is achieved from the very beginning of the pulse and an essentially undelayed following of the control pulse TXC. The method presented is useful on all required power levels.

In the RF signal path of the booster 2 there is a power divider 17 that separates a transmit branch 13,15 and a receive branch 12 from each other. Filters or a switch can be used for the same purpose. On the other hand the amplifiers 12,13 are connected to the antenna 18 via a duplexer 16 as stated in the SUMMARY OF THE INVENTION, the power amplifier 13 of the booster amplifier 2 may be an AB class power amplifier. The purpose of the receiver amplifier 12 is to amplify the received signal to achieve a sufficient noise figure. The direction switch 15 delivers a feedback signal from the output to a power control circuit 14 that sets the bias voltages to the amplifiers 13 over a control line, according to the input signals TXP and TXC-DA. As previously stated in the SUMMARY OF THE INVENTION an AB class power amplifier can be used as the power amplifier of the booster. Control signal TXE connects the operating voltages to the transmitter stages, when a phone call begins. The external connector of the power divider is joined via connection 19 to a connector 11, to which the control signals TXP, TXE and TXC-DA are also connected. There may be a cable between the connector 11 and the booster to make it possible to locate the booster, e.g. in a vehicle use, in a different place from the adapter where the portable radio telephone is mounted as connected to the connector 11 in vehicular use. The booster unit also contains a local power unit, an installation rack and the connectors required for the antenna cables not shown in further detail for the reason of simplicity.

In accordance with the invention a switch 9 is inserted in the control signal TXC-DA path in the portable radio telephone 1, said switch changing, in booster use, the power control circuit control signal TXC to a constant voltage $V_{bst}$ according to the logic control BST. Thereby the portable radio telephone transmits pulses of predetermined size and of constant power irrespective of the level of the TXC-DA signal. At the same time the control signals already mentioned are connected to the booster via the auxiliary connector 11, and also the antenna signal is connected by the antenna switch 7 to the booster. Hereby the TXC-DA signal controls only the power of the booster amplifier.

The portable radio telephone 1 and the booster 2 now have similar power control circuits 4 and 14 respectively. They also receive the same control signals, TXP and TXC-DA. Because of that the timing of the transmit pulse, as well as the wave shape of the leading and the trailing edges thereof, remain equivalent in both uses, i.e. both when using the portable radio telephone 1 by itself and with the booster 2. Furthermore, the same kind of AB class power amplifier as in car phones (mobile radio telephones) can be used as a power amplifier of the booster.

In analog systems separating of the transmit and receive signals requires two duplexers in the booster. In this method of the invention only one duplexer 16 is required. The other one can be substituted by the power divider 17, the receive branch amplifier 12 being switched on and off by the TXP pulse, via the control line shown as a dashed line 20. Alternatively, instead of the duplexer an RF switch can be used, also controlled by the TXP pulse via the control line shown as a dashed line 21.

In view of the foregoing it will be clear to a person skilled in the art that modifications may be incorporated without departing from the scope of the present invention.

What I claim is:

1. A circuit for implementing a booster amplifier for a portable radio telephone in a digital mobile phone system, where the transmit power level of the booster amplifier (2) is controlled from the portable radio telephone by two control signals (TXC-DA, BST), comprising:

a digital portable radio telephone circuit (1) including a source (10) of control signals, first control signal TXC-DA and logic control signal BST, a first power amplifier (3), responsive to a digital RF transmission signal, a control circuit (4) connected to said power amplifier (3), a first switch means (9) connected to said source of two control signals (10) and responsive to said TXC-DA and BST control signals therefrom, said first switch means (9) selectively providing a power control circuit signal TXC and a predetermined signal $V_{bst}$ to said control circuit (4), a separate booster amplifier (2) circuit including a divider (17) circuit connected to the output of said digital portable radio telephone circuit (1), a second power amplifier (13) connected to the output of said divider circuit (17), a second control circuit (14) connected to said source (10) of control signals from said radio telephone circuit (1) and responsive to said TXC-DA control signal therefrom, wherein said switch means (9) of said radio telephone circuit, which, under the control of logic control signal (BST), changes said power control circuit signal (TXC) from said first switch means (9) to said predetermined signal ($V_{bst}$), and an output of substantially constant power is fed from the portable radio telephone to said second power amplifier (13) of said booster amplifier (2) to be amplified to the level of said first control signal (TXC-DA) from said radio telephone circuit (1).

2. A circuit according to claim 1, wherein said source (10) of control signals further provides a control pulse signal TXP and wherein said divider circuit (17) connects the said output of said digital portable radio telephone circuit (1) selectively to the input of the said power amplifier (13) and to the output of said receiver amplifier (12), the power of the receiver amplifier of said booster amplifier (2) being adapted to be switched on and off by said control pulse signal TXP from said source of control signals (10) from said radio telephone circuit (1).

3. A circuit according to claim 2, wherein said divider circuit (17) in said booster amplifier (2) is an RF switch under the control of the said control pulse signal (TXP) (21) from said radio telephone circuit (1).

4. A circuit claimed in claim 1, wherein said second amplifier (13) of the said booster amplifier (2) comprises an AB class amplifier.

* * * * *